United States Patent
Pala et al.

(10) Patent No.: US 7,936,258 B2
(45) Date of Patent: May 3, 2011

(54) SMART LEGIBILITY ADJUSTMENT FOR VEHICULAR DISPLAY

(75) Inventors: Silviu Pala, Birmingham, MI (US); Christopher Alan Arms, Farmington Hills, MI (US)

(73) Assignee: DENSO International America, Inc., Southfield, MI (US)

( * ) Notice: Subject to any disclaimer, the term of this patent is extended or adjusted under 35 U.S.C. 154(b) by 433 days.

(21) Appl. No.: 12/079,870

(22) Filed: Mar. 28, 2008

(65) Prior Publication Data

US 2009/0243819 A1    Oct. 1, 2009

(51) Int. Cl.
*G09F 9/00* (2006.01)
*G06F 3/038* (2006.01)
*G09F 9/30* (2006.01)
*G09G 5/00* (2006.01)
*G08B 3/00* (2006.01)

(52) U.S. Cl. ........ 340/461; 345/204; 345/207; 345/214; 340/691.6; 340/462

(58) Field of Classification Search .................. 340/540, 340/461–462, 691.6; 345/207
See application file for complete search history.

(56) References Cited

U.S. PATENT DOCUMENTS

| | | | | |
|---|---|---|---|---|
| 6,483,245 | B1* | 11/2002 | Weindorf et al. | 315/82 |
| 7,724,247 | B2* | 5/2010 | Yamazaki et al. | 345/207 |
| 2002/0113801 | A1* | 8/2002 | Reavy et al. | 345/589 |
| 2005/0041294 | A1* | 2/2005 | Drummond et al. | 359/604 |
| 2005/0128192 | A1* | 6/2005 | Heintzman et al. | 345/207 |
| 2005/0200700 | A1* | 9/2005 | Schofield et al. | 348/148 |
| 2006/0044300 | A1* | 3/2006 | Koyama et al. | 345/207 |
| 2006/0061542 | A1* | 3/2006 | Stokic | 345/156 |
| 2006/0256067 | A1* | 11/2006 | Montero et al. | 345/102 |
| 2007/0139405 | A1* | 6/2007 | Marcinkiewicz | 345/207 |
| 2009/0234582 | A1* | 9/2009 | Figueroa | 701/216 |

FOREIGN PATENT DOCUMENTS

JP    2004 314860    11/2004

* cited by examiner

*Primary Examiner* — Benjamin C Lee
*Assistant Examiner* — Andrew Bee
(74) *Attorney, Agent, or Firm* — Harness, Dickey & Pierce, PLC

(57) ABSTRACT

A display system for a vehicle system includes at least one light sensor that detects a light condition, and a display member that displays an information message. The information message includes a background and an object that is displayed adjacent the background. The display system further includes a controller that changes legibility of the information message by changing each of the background and the object based on the light condition detected by the light sensor. A method of controlling the display system is also disclosed.

14 Claims, 4 Drawing Sheets

SMART LEGIBILITY ADJUSTMENT FOR VEHICULAR DISPLAY

FIELD

The present disclosure relates to a vehicular display and, more particularly, relates to a smart legibility adjustment system for a vehicular display.

BACKGROUND

The statements in this section merely provide background information related to the present disclosure and may not constitute prior art.

Vehicles typically include a display system that displays information to a vehicle occupant. For instance, vehicles often include an instrument panel that displays gauges, warning messages, and the like. Vehicles can also include navigational systems that display maps, driving directions, and other related information to occupants. Similarly, vehicles include entertainment systems with a video screen that plays movies and the like.

While these display systems have functioned for their intended purpose, they have also suffered from certain drawbacks. For instance, the information displayed by these systems may be difficult to view in certain light conditions. When direct sunlight is shining on the video screen, for instance, the messages displayed thereon may be difficult to see. In addition, when there is a high amount of light noise within the normal field of vision of the user (e.g., glare, light reflecting from surrounding vehicles, light from headlights of oncoming vehicles, etc.), the user may have difficulty viewing and perceiving the information displayed from the display system.

In partial response to this problem, certain improvements have been proposed for display systems. For instance, display systems can include one or more manual controls for manually controlling brightness, contrast, etc. of the displayed information. However, these manual controls may be burdensome in certain situations and/or it may be difficult for a user to manually adjust the display in certain situations.

SUMMARY

A display system for a vehicle is disclosed. The display system includes at least one light sensor that detects a light condition, and a display member that displays an information message. The information message includes a background and an object that is displayed adjacent the background. The display system further includes a controller that changes legibility of the information message by changing each of the background and the object based on the light condition detected by the light sensor.

A method of operating a display system of a vehicle is also disclosed. The method includes detecting a light condition relative to an occupant of the vehicle. The method also includes displaying an information message from a display member. The information message includes a background and an object that is displayed adjacent the background. Furthermore, the method includes changing legibility of the information message by changing each of the background and the object based on the detected light condition.

In still another aspect, a display system for a vehicle is disclosed. The display system includes at least one light sensor that detects a light condition relative to an occupant of the vehicle. The display system further includes a display member that displays an information message. The information message includes a background and an object that is displayed adjacent the background. Furthermore, the display system includes a controller that changes legibility of the information message based on the light condition detected by the light sensor. Legibility of the information message is changed by changing a relative luminance of the object and the background, increasing a color contrast between the object and the background, increasing a size of the object, and/or adding a special effect for the object.

Additionally, a method of operating a display system of a vehicle is disclosed. The method includes detecting a light condition relative to an occupant of the vehicle. The method further includes displaying an information message from a display member. The information message includes a background and an object that is displayed adjacent the background. Moreover, the method includes changing legibility of the information message based on the detected light condition. The legibility is changed by changing a relative luminance of the object and the background, increasing a color contrast between the object and the background, increasing a size of the object, and/or adding a special effect for the object.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 1:
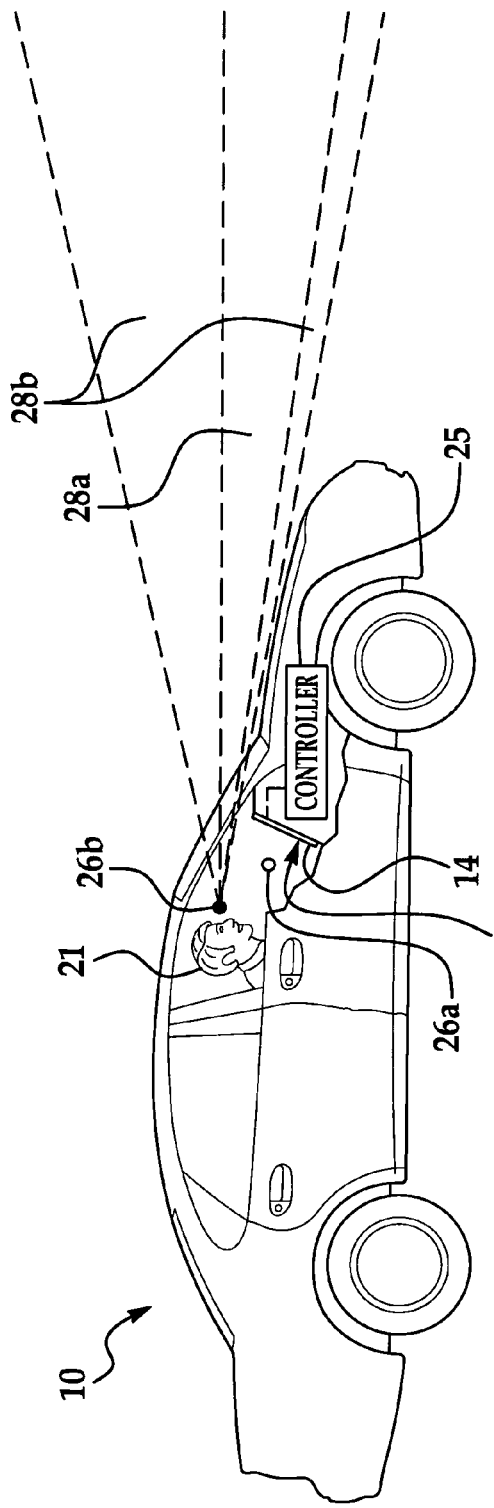
FIG. 1 is a side view of a vehicle with a display system according to various embodiments of the present disclosure.
Figure 3A:
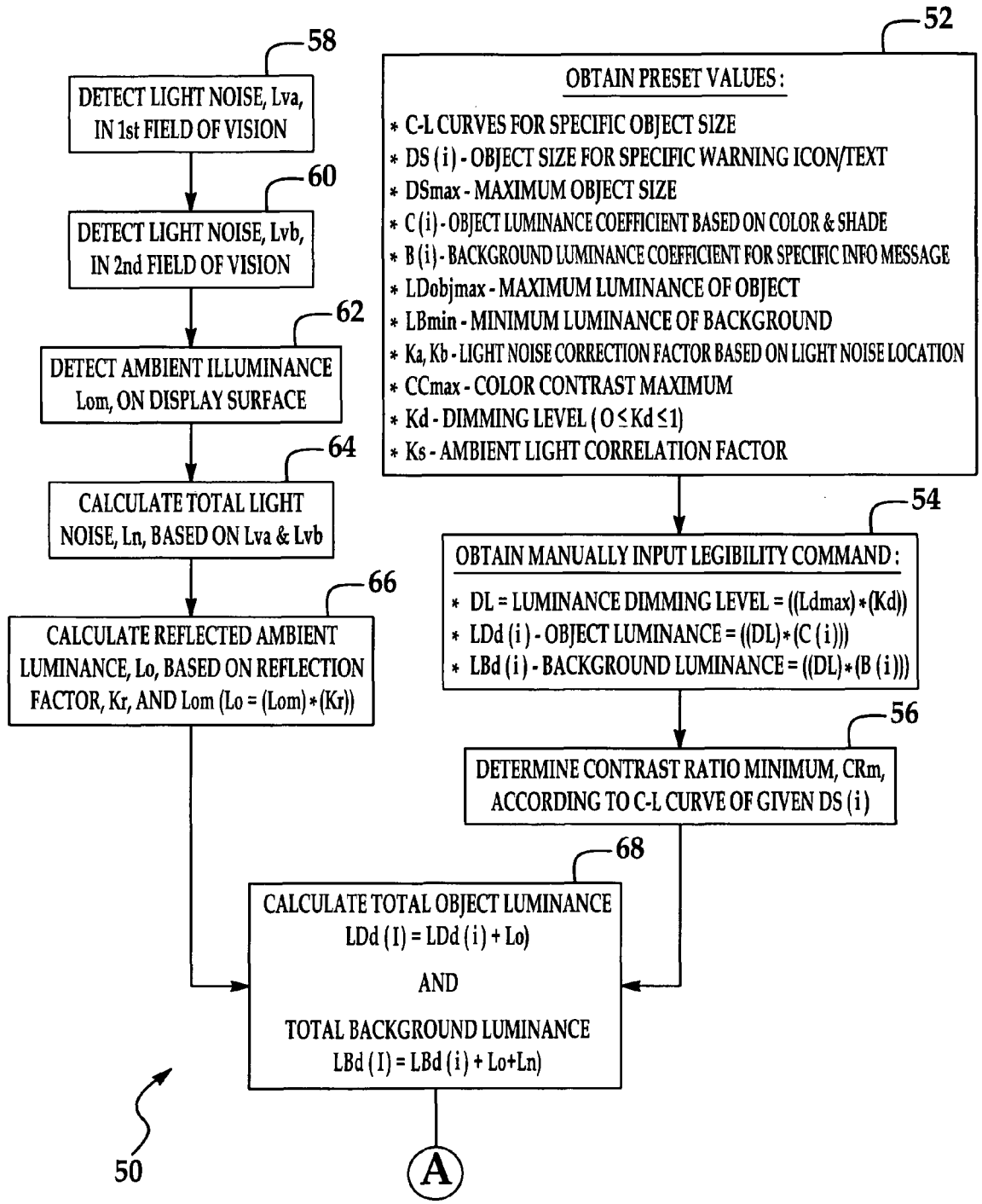
Figure 3B:
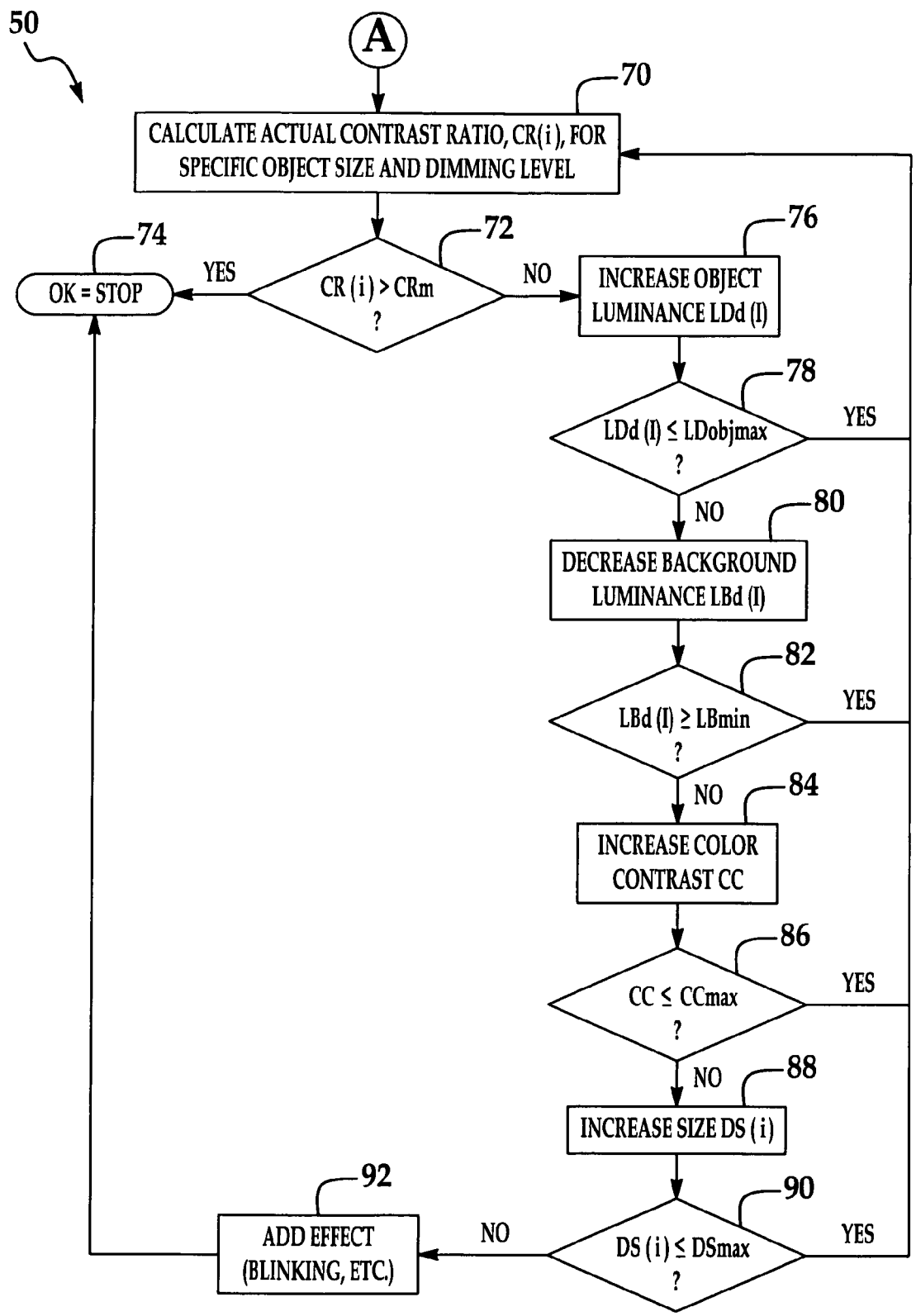
Figure 4:
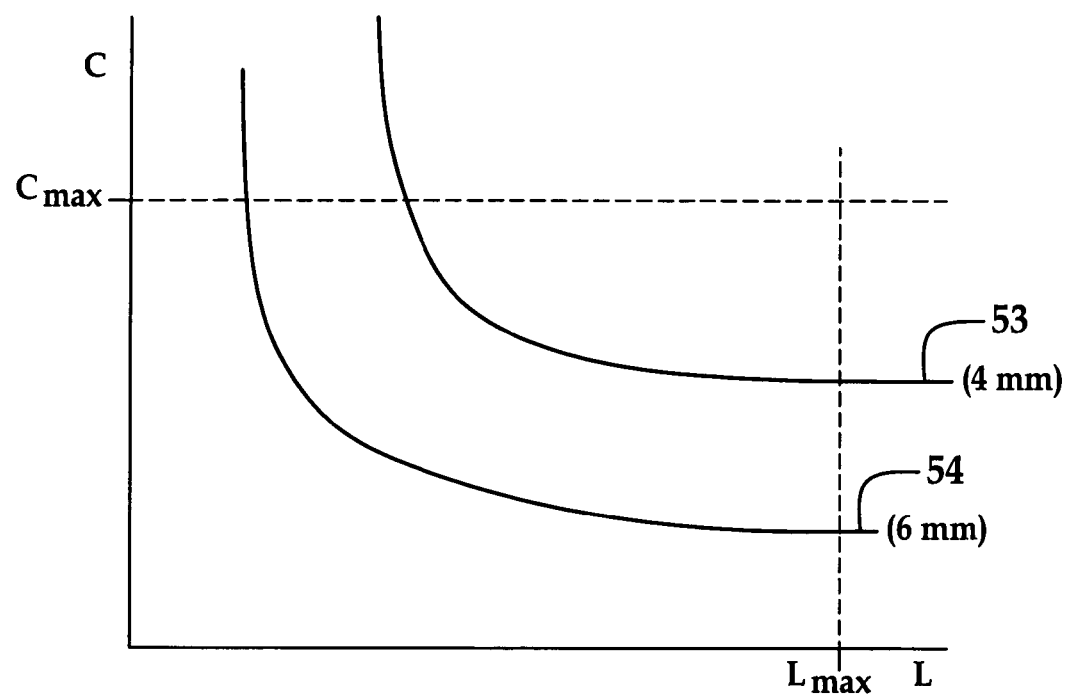

FIGS. 3A and 3B is a flow chart illustrating a method of operating the display system of the vehicle of FIG. 1 according to various embodiments of the present disclosure, wherein FIG. 3A illustrates one portion of the flow chart, and FIG. 3B illustrates another portion of the flow chart; and FIG. 4 is a graphical illustration of C-L curves (i.e., legibility curves) representing contrast ratio minimum curves for a given color based on the luminance of an information message displayed by the display system, contrast of the information message, and size of an object displayed by the display system.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
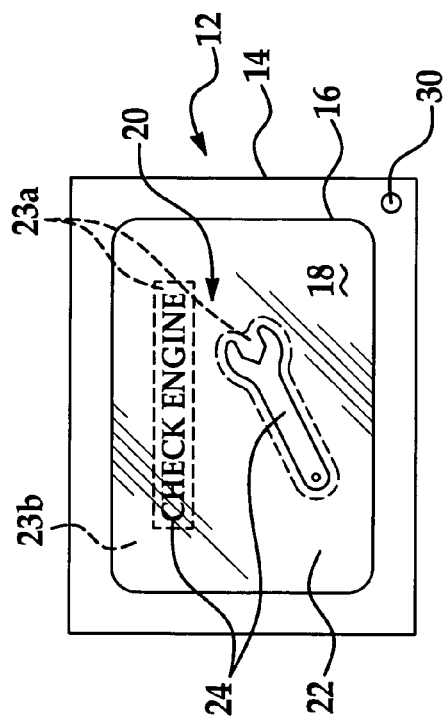
FIG. 2 is a schematic top view of the display system of FIG. 1.

Referring initially to FIGS. 1 and 2, a vehicle 10 is illustrated that includes a display system 12 constructed according to various embodiments of the present disclosure. The display system 12 includes a display member 14 with a screen 16. It will be appreciated that the display member 14 could be of any suitable type, such as a liquid crystal display and/or an emissive display.

The screen 16 defines a surface 18 from which an information message 20 is displayed. As will be discussed, display of the information message 20 is changed according to light conditions relative to an occupant 21 (e.g., the driver) in order to make the information message 20 more legible to the occupant 21.

It will be appreciated that the display member 14 could be mounted in the vehicle 10 in any suitable location. For instance, the display member 14 could be mounted in the dashboard of the vehicle 10 and be part of the instrument cluster and/or navigational system. The display member 14 could also be mounted to a seat and/or suspended from an interior roof of the vehicle 10 and be a part of a video entertainment system.

It will be appreciated that the information message 20 displays information of any suitable type. For instance, the information message 20 could pertain to and give status of the subsystems of the vehicle, such as the engine system, the ground traction system, the door system, and the like. The information message 20 could also be a visual entertainment information message, such as a motion picture displayed from a video entertainment system. Furthermore, the information message 20 could be geographic information, such as a map displayed from a navigational system. It will also be appreciated that the information message 20 could be of an alphanumeric type, and/or the information message 20 could be a picture and/or symbol.

As shown in the embodiments represented in FIG. 2, the information message 20 includes a background 22 and an object 24 that is displayed adjacent (e.g., displayed within) the background 22. In the various embodiments represented in FIG. 2, the background 22 spans substantially over the entire screen 16, and the objects 24 displayed within the background 22 include a "check engine" message and also a symbol of a wrench to indicate that maintenance of the vehicle 10 is necessary.

It will be appreciated that the background 22 could be localized about the object 24 instead of spanning substantially over the entire screen 16. For instance, the "check engine" message and the wrench symbol could be surrounded by a nearby or adjacent background 23a that is different from other portions 23b of the background 22. It will also be appreciated that the adjacent background 23a for the "check engine" message could be different from the adjacent background 23a for the wrench symbol. It will also be appreciated that the adjacent background 23a could comprise a border that substantially traces the outer periphery of the corresponding object 24.

It will be appreciated that the display member 14 displays the object 24 at a certain luminance value. This luminance value is perceived by the occupant 21 as brightness of the object 24. Similarly, the display member 14 displays the background 22 at a certain luminance value that is perceived by the occupant 21 as brightness of the background 22. It will also be appreciated that the luminance of the object 24 relative to the luminance of the background 22 can be expressed as a contrast ratio. Thus, if the background 22 is displayed at a relatively low luminance, and the object 24 is displayed at a relatively high luminance, the corresponding information message 20 has a high contrast ratio. Also, if the background 22 is displayed at a relatively high luminance, and the object 24 is displayed at a relatively low luminance, the corresponding information message 20 has a high contrast ratio.

In addition, it will be appreciated that the background 22 and the object 24 can be displayed with individual colors. It will be appreciated that the colors used to display the background 22 and the object 24 can be similar or different (e.g., as determined according to a color spectrum, a color wheel, and/or any other predetermined scale). The difference in color between the background 22 and the object 24 can be expressed as the color contrast between the background 22 and the object 24. It will be appreciated that there are a plurality of known formulas for calculating color contrast, any of which can be utilized without departing from the scope of the present disclosure.

The display system 12 further includes a controller 25. The controller 25 can include circuitry, programmed logic, computer memory, and the like. The controller 25 is in communication with the display member 14 so as to display and change the information message 20 displayed thereby. As will be explained, the controller 25 transmits control signals to thereby change the legibility of the information message 20.

Referring to FIG. 4, a plurality of exemplary C-L curves 53, 54 (i.e., legibility curves) are illustrated. As shown, each C-L curve 53, 54 graphically illustrates predetermined minimum contrast ratios for a given color of the object 24 based on the luminance of the information message 20, the contrast of the information message 20, and the size of the object 24. More specifically, the graph of FIG. 4 includes a first C-L curve 53, which represents the minimum contrast ratio for an object 24 approximately 4 mm tall to remain legible. In other words, for an object 24 that is 4 mm tall to remain legible, the information message 20 should have a contrast, C, and a luminance, L, above the first C-L curve 53. Also, a second C-L curve 54 is included in FIG. 4, and illustrates a minimum contrast ratio for an object 24 that is approximately 6 mm tall. As shown, the minimum contrast ratio is less for larger objects 24. It will be appreciated that the controller 25 can include any number of C-L curves 53, 54 in look-up tables, and the like. Also, it will be appreciated that data for creating the C-L curves 53, 54 can be obtained through experimentation. Moreover, it will be appreciated that the C-L curves 53, 54 can be specific for any number of factors, such as the age of the occupant 21, the gender of the occupant 21, and/or the visual acuity of the occupant 21.

Furthermore, a contrast maximum, $C_{max}$, and luminance maximum, $L_{max}$, are indicated on the graph of FIG. 4. These values represent the maximum contrast, $C_{max}$, and the maximum, $L_{max}$, that the screen 16 is able to generate due to physical, material, electrical, and other constraints of the screen 16. As will be explained in greater detail, the controller 25 displays the information message 20 such that the information message 20 exhibits a contrast ratio above the minimum contrast ratio (i.e., above the predetermined C-L curve 53, 54), but yet below the maximum contrast, $C_{max}$, and maximum luminance, $L_{max}$.

As will be explained, the controller 25 can change legibility of the information message 20 in one or more of a variety of ways. For instance, in some embodiments, the controller 25 changes legibility of the information message 20 by changing luminance of the object 24, changing luminance of the background 22, changing relative luminance of the object 24 and the background 22, changing color contrast between the object 24 and the background 22, changing the size of the object 24, and/or adding a special effect for the object 24 (e.g., making the object blink on and off). As such, it will be appreciated that the controller 25 can change each of the background 22 and the object 24, the size, and any special effects of the information message 20 in order to precisely and accurately change legibility of the information message 20.

The display system 12 also includes at least one, and in some embodiments, a plurality of light sensors 26a, 26b that detect a light condition relative to the occupant 21 of the vehicle 10. The light sensors 26a, 26b are in communication with the controller 25, and the controller 25 changes legibility of the information message 20 based on the light conditions detected by the light sensors 26a, 26b as will be explained.

In the various embodiments represented in FIG. 1, the display system 12 includes a display surface light sensor 26a and a light noise sensor 26b. It will be appreciated that the display surface light sensor 26a and the light noise sensor 26b can be of any suitable type, such as a photosensor, a CCD camera, and the like. It will be appreciated that the light sensors 26a, 26b could be configured to detect light if light levels within a certain area are above a predetermined threshold. The light sensors 26a, 26b can also be configured to detect light intensity within a certain area and/or detect the location of the light within the area. In one embodiment, the light sensors 26a, 26b are mounted to a rear view mirror (not shown) of the vehicle.

The display surface light sensor 26a detects ambient illuminance, Lom, affecting the surface 18 of the display member 14. In other words, the display surface light sensor 26a detects an amount of ambient light that is falling on and is reflected by the surface 18 of the display member 14. In some embodiments, the ambient illuminance, Lom, will be higher if direct sunlight is falling on the surface 18 than if the vehicle 10 is traveling along a dark street at nighttime. As will be understood, the legibility of the information message 20 is affected by the amount of ambient illuminance, Lom. Thus, as will be discussed in greater detail, the display surface light sensor 26a detects the amount of ambient illuminance, Lom, and changes the legibility of the information message 20 based on the detected ambient illuminance, Lom.

According to various embodiments represented in FIG. 1, the light noise sensor 26b detects a light noise condition within an area 28a, 28b corresponding approximately to a predetermined field of vision of the occupant 21. For example, the light noise sensor 26b detects direct sunlight, highly reflective surfaces, illuminated oncoming headlights, approximately within the area 28a, 28b.

Furthermore, in the embodiments represented in FIG. 1, the light noise sensor 26b detects a first light noise condition approximately within a first area 28a and a second light noise condition approximately within a second area 28b. The first area 28a is predetermined generally according to a more critical field of vision of the occupant 21, and the second area 28b is predetermined generally according to a less critical field of vision of the occupant 21. For example, if the occupant 21 is a driver of the vehicle 10, the first area 28a spans approximately directly ahead of the vehicle 10 and generally downward toward the road, and the second area 28b spans approximately surrounding the first area 28a and includes areas further above the road, immediately in front of the vehicle 10, and to the sides of the road. It will be appreciated, however, that the first and second areas 28a, 28b could span any suitable area, and it will be appreciated that the light noise sensor 26b could detect light noise within a single area 28a, 28b. It will further be understood that multiple light noise sensors 26b could be included for detecting light noise in the one or more areas 28a, 28b.

As will be explained, the light noise sensor 26b distinguishes between light noise in the different areas 28a, 28b. For example, it can be assumed that a driver tends to focus more within the first area 28a when driving as compared to the second area 28b. As such, it can be assumed that light noise (e.g., glare, direct sunlight, etc.) within the first area 28a is more likely to affect the driver's ability to perceive the information message 20 as compared to light noise within the second area 28b. Thus, as will be explained, the controller 25 changes legibility of the information message 20 based on which of the first and second areas 28a, 28b in which the light noise condition is detected.

In the embodiments represented in FIG. 2, the display system 12 further includes a manual control member 30 with which a legibility command is manually input. For instance, in some embodiments, the manual control member 30 is a knob, slider, or button, and the user manipulates the control member 30 to manually change a dimming level (i.e., the luminance) of the information message 20. In some embodiments, the background 22 and the object 24 are each changed equally when the control member 30 is operated by the occupant 21. As will be described in greater detail, the controller 25 accounts for the dimming level (i.e., the luminance) manually input from the control member 30 when changing the legibility of the information message 20.

Referring now to FIGS. 3A and 3B, a method 50 of operating the display system 12 is illustrated. It will be appreciated that the controller 25 can function using one or more algorithms for operation of the display system 12 according to the method 50.

The method 50 begins in step 52 when various preset values are obtained. In other words, it is determined that an information message 20 is to be displayed by the display system 12, and in step 52, preprogrammed commands and values are accessed from the controller (e.g., from computer memory) dictating how the information message 20 is to be displayed. It will be appreciated that different information messages 20 can be displayed differently as dictated by the preset values obtained in step 52.

In some embodiments, step 52 includes obtaining the C-L curves 53, 54 from computer memory or the like. It will be appreciated that the obtained C-L curves 53, 54 can be general and relate to all colors of the object 24, sizes of the object 24, age of the occupants 21, gender of the occupant 21, visual acuity of the occupant 21, and the like.

Step 52 can also include obtaining the preset/preprogrammed size, DS(i), of the object 24 to be displayed. In addition, step 52 involves obtaining a predetermined maximum size of the object 24, $DS_{max}$. The maximum size of the object 24, $DS_{max}$, can be of any suitable value. For instance, the maximum size of the object 24, $DS_{max}$, could be equal to the size of the screen 16.

Also, step 52 involves obtaining the preprogrammed luminance coefficients of the object 24, C(i), based on a preprogrammed color and shade of the object 24. Furthermore, step 52 includes obtaining preprogrammed luminance coefficients of the background 22, B(i), for a specific information message 20.

Additionally, step 52 includes obtaining the maximum luminance of the object 24, $LD_{objmax}$. Similarly, step 52 includes obtaining the minimum luminance of the background 22, LBmin. These values can be of any suitable value. For instance, these values can be predetermined according to the physical, material, and/or electrical limits of the screen 16.

Furthermore, step 52 includes obtaining a color contrast maximum, $CC_{max}$, between the object 24 and the adjacent background 23a. The color contrast maximum, $CC_{max}$, can be of any suitable value.

Moreover, step 52 includes obtaining preprogrammed noise correction factors, Ka, Kb, based on the location of the light noise detected by the light sensor 26b (i.e., in which area 28a, 28b the light noise is detected). The noise correction factors, Ka, Kb can be predetermined based on experimentation (e.g., HMI experimentation).

In addition, step 52 includes obtaining a preprogrammed dimming constant, Kd. In some embodiments, the dimming constant is between the values 0 and 1. Furthermore, step 52 includes obtaining an ambient light correlation factor, Ks, between the reflection properties of the display surface 18 and a nearby surface reflection property used by the sensor 26a for detecting the ambient illuminance of the display system 12.

Next, the method 50 includes step 54, in which manually input legibility commands are obtained by the controller 25. More specifically, in some embodiments, the controller 25 detects the dimming levels manually set with the manual control member 30. In some embodiments, step 54 includes obtaining the luminance dimming level, DL, and the luminance dimming level, DL, is equal to the maximum display luminance $Ld_{max}$ multiplied by the dimming constant, Kd, (i.e., $DL=Ld_{max} \times Kd$). Furthermore, in some embodiments, step 54 includes obtaining the luminance of the object, LDd(i). In some embodiments, the luminance of the object, LDd(i) is equal to the luminance dimming level, DL multiplied by the preset object luminance, C(i), (i.e., $LDd(i)=DL \times C(i)$). Furthermore, step 54 can include obtaining the luminance of the adjacent background 23a, LBd(i). In some embodiments, the luminance of the adjacent background 23a, LBd(i), is calculated by multiplying the luminance dimming level, DL, by the preset luminance of the background, B(i) (i.e., $LBd(i)=DL \times B(i)$).

Next, the method 50 includes step 56, in which the contrast ratio minimum, CRm, is determined according to the C-L curve for a given object size, DS(i). In other words, the contrast ratio minimum, CRm, of the types shown in FIG. 4 is determined for a given object size, DS(i). In some embodiments, the contrast ratio minimum CRm is determined according to the age of the occupant 21, the gender of the occupant 21, the visual acuity of the occupant 21, and the like. In some embodiments in which the age, gender, visual acuity, etc. of the occupant 21 is not considered, a default contrast ratio minimum, CRm, is determined in step 56.

Meanwhile, the method includes detecting the light noise, Lva, in the first area 28a in step 58, and detecting the light noise, Lvb, in the second area 28b in step 60 using the light sensor 26b. Also, in step 62, the ambient illuminance, Lom, on the display surface 18 is detected with the light sensor 26a. These values are communicated to the controller 52.

Next, in step 64, the total light noise, Ln, is calculated by the controller 25 based on the light noise detected in the first and second areas 28a, 28b. In some embodiments, the total light noise, Ln, is determined by adding the product of the light noise, Lva, in the first area 28a and the noise correction factor Ka and the light noise, Lvb, in the second area 28b and the noise correction factor Kb (i.e., $Ln=(Ka \times Lva)+(Kb \times Lvb)$).

Subsequently, in step 66, the reflected ambient luminance, Lo, based on a preprogrammed reflection factor, Kr, and the detected ambient illuminance, Lom are each calculated. It will be appreciated that the reflection factor, Kr, can be preprogrammed according to the reflectiveness of the material used to the make the screen 16. Also, in one embodiment, step 66 involves multiplying the detected ambient illuminance, Lom, by the preprogrammed reflection factor, Kr, (i.e., $Lo=Lom \times Kr$). Furthermore, the detected ambient illuminance, Lom, can be detected from an equivalent surface with the ambient light correlation factor, Ks, obtained in step 52 (i.e., $Lo=Lom \times Kr \times Ks$).

Then, in step 68, the total luminance of the object 24 and the total luminance of the background 22 are calculated by the controller 25. In some embodiments, the total object luminance, LDd(l), is calculated by adding the object luminance, LDd(i), obtained in step 54 and the reflected ambient luminance, Lo, calculated in step 56 (i.e., $LDd(l)=LDd(i)+Lo$). Furthermore, in some embodiments, the total background luminance, LBd(l), is calculated by adding the background luminance, LBd(i), obtained in step 54 and the reflected ambient luminance, Lo, calculated in step 66 and light noise, Ln, detected in step 64 (i.e., $LBd(l)=LBd(i)+Lo+Ln$).

Then, as shown in FIG. 3B, the method 50 continues in step 70. In step 70, the actual contrast ratio, CR(i), for a specific size of the object 24 and dimming level is calculated. It will be appreciated that the actual contrast ratio, CR(i), is the contrast ratio actually displayed by the screen 16 before being adjusted for legibility by the controller 25. As will be explained, the method 50 subsequently adjusts the information message 20 to make the object 24 more legible.

Next, the method 50 includes decision block 72, in which it is determined whether the actual contrast ratio, CR(i), is greater than the minimum contrast ratio, CRm, determined in step 56. If decision block 72 is answered in the affirmative, the method 50 ends at termination block 74. However, if decision block 72 is answered in the negative, the method 50 continues in step 76.

In step 76, the controller 25 increases the luminance of the object 24, LDobj. Then, in decision block 78, it is determined whether the luminance of the object 24, LDobj, increased in step 76, is less than or equal to the maximum luminance of the object 24, LDobjmax, determined in step 52. If decision block 78 is determined in the affirmative, steps 70 and 72 follow.

However, if decision block 78 is answered in the negative, step 80 follows, in which the luminance of the background 22, LBd(l), is decreased. Then, in decision block 82, it is determined whether the luminance of the background 22, LBd(l), is greater than or equal to the minimum luminance of the background 22, LBmin, determined in step 52. If decision block 82 is answered in the affirmative, steps 70 and 72 follow.

However, if decision block 82 is answered in the negative, step 84 follows. In step 84, the color contrast, CC, between the object 24 and the background 22 is increased. Then, in decision block 86, it is determined whether the color contrast, CC, is less than or equal to the maximum color contrast, CCmax, obtained in step 52. If decision block 86 is answered in the affirmative, steps 70 and 72 follow.

However, if decision block 86 is answered in the negative, the size of the object 24 is increased in step 88. Then, in decision block 90, it is determined whether the object size, DS(i) is less than or equal to a maximum object size, DSmax, determined in step 52. If decision block 90 is determined in the affirmative, steps 70 and 72 follow as described above.

However, if decision block 90 is answered in the negative, an effect of the information message 20 is added in step 92, and determination block 74 follows. In some embodiments, the information message 20 is normally not animated, and step 92 causes the object 24 to blink on and off, thereby making the information message 20 more legible and easier to perceive.

Thus, it will be appreciated that the information message 20 can be made more legible depending on the light conditions detected by the light sensors 26a, 26b. It will be appreciated that the legibility of the information message 20 can be changed by one or more the methods described herein (i.e., increasing LDobj, decreasing LBd(l), increasing CC, increasing DS(i), and/or adding effects). It will also be appreciated that the methods for increasing legibility can occur in any suitable order. Accordingly, the legibility of the information message 20 is automatically adjusted, and the occupant 21 of the vehicle 10 can more easily read and perceive the information message 20.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A display system for a vehicle comprising:
   a display member that displays an information message, the information message including a background and an object that is displayed adjacent the background, the display member defines a surface from which the information message is displayed;
   a display surface light sensor that detects an ambient illuminance on the surface of the display member for calculating a reflected ambient luminance on the surface of the display member;
   a light noise sensor that detects a light noise condition within an area corresponding approximately to a forward area in front of the vehicle;
   a controller that calculates a total object luminance by adding a luminance of the object and the reflected ambient luminance without adding the light noise condition, the controller also calculates a total background luminance by adding a luminance of the background, the reflected ambient luminance, and the light noise condition, the controller changes legibility of the information message by changing each of the background and the object based on an actual contrast of the information message, which is a ratio between the total object luminance and the total background luminance, and a predetermined relationship between luminance and contrast.

2. The display system of claim 1, wherein the controller changes legibility of the information message by at least one of increasing the luminance of the object, decreasing the luminance of the background, increasing a color contrast between the object and the background, increasing a size of the object, and adding a special effect for the object based on a plurality of predetermined relationships between luminance and contrast, the plurality of predetermined relationships being specific for any number of factors to be changed.

3. The display system of claim 2, wherein the special effect for the object causes the object to blink.

4. The display system of claim 1, wherein the light noise sensor distinguishes between a light noise condition within a first area corresponding approximately to a first field of vision of the occupant and a second area corresponding approximately to a second field of vision of the occupant, and
   wherein the controller changes legibility of the information message based on which of the first and second areas in which the light noise condition is detected.

5. The display system of claim 1, wherein the display member includes at least one of a liquid crystal display and an emissive display.

6. The display system of claim 1, wherein the display member includes a manual control member with which a manually input legibility command is input, and
   wherein the controller accounts for the manual input legibility command when changing the legibility of the information message.

7. The display system of claim 6, wherein the manual control member is a manual dimming control member with which a manually input dimming level of information message is input, and
   wherein the controller accounts for the manually input dimming level of the information message when changing the legibility of the information message.

8. A method of operating a display system of a vehicle comprising:
   detecting an ambient illuminance on a surface of the display member;
   calculating a reflected luminance on the surface of the display member based on the ambient illuminance;
   detecting a light noise condition within an area corresponding approximately to a forward area in front of the vehicle;
   displaying an information message from a display member, the information message including a background and an object that is displayed adjacent the background;
   calculating a total object luminance by adding a luminance of the object and the reflected ambient luminance without adding the light noise condition;
   calculating a total background luminance by adding a luminance of the background, the reflected ambient luminance and the light noise condition; and
   changing legibility of the information message by changing each of the background and the object based on an actual contrast of the information message, which is a ratio between the total object luminance and the total background luminance, and a predetermined relationship between luminance and contrast.

9. The method of claim 8, further comprising changing legibility of the information message comprises by at least one of increasing the luminance of the object, decreasing the luminance of the background, increasing a color contrast between the object and the background, increasing a size of the object, and adding a special effect for the object based on a predetermined plurality of predetermined relationships between luminance and contrast, the plurality of predetermined relationships being specific for any number of factors to be changed.

10. The method of claim 9, wherein adding a special effect of the information message comprises causing the object to blink.

11. The method of claim 8, further comprising
    distinguishing between a light noise condition within a first area corresponding approximately to a first field of vision of the occupant and a second area corresponding approximately to a second field of vision of the occupant, and
    changing legibility of the information message based on which of the first and second areas in which the light noise condition is detected.

12. The method of claim 8, further comprising accounting for a manually input legibility command when changing legibility of the information message based on the detected light condition.

13. The method of claim 12, further comprising accounting for a manually input dimming level of the information message when changing legibility of the information message based on the detected light condition.

14. The display system of claim 1 further comprising lookup tables that contain a plurality of predetermined relationships between luminance and contrast each predetermined relationship is specific for any one of color of the object, size of the object, age of an occupant of the vehicle, gender of the occupant and visual acuity of the occupant.

* * * * *